UNITED STATES PATENT OFFICE.

FRANK J. TONE, OF NIAGARA FALLS, NEW YORK.

MANUFACTURE OF SILICIDES AND SILICON ALLOYS.

No. 833,427.	Specification of Letters Patent.	Patented Oct. 16, 1906.

Application filed May 18, 1905. Serial No. 261,067.

*To all whom it may concern:*

Be it known that I, FRANK J. TONE, of Niagara Falls, Niagara county, New York, have invented a new and useful Improvement in the Manufacture of Silicides and Silicon Alloys, of which the following is a full, clear, and exact description.

My invention refers to the use of silicon carbid in the production of metallic silicides and silicon alloys. It may be applied in the production of various silicides—such as silicides of iron, copper, manganese, aluminium, calcium, or double silicides of these metals—and to silicon alloys. The process of manufacture may be best illustrated by describing its use in the manufacture of ferrosilicon, and I will do so, premising that my invention is not limited thereto and that as defined in the broader claims it is intended to be covered irrespective of the particular character of the product which is made thereby and also whether the carbid employed is carbid of silicon or a carbid of some other element capable of combining as an alloy or compound with the added metal of the charge.

If a mixture of carborundum and iron be fused and heated to the temperature ordinarily obtained in the manufacture of steel, the iron will absorb only limited quantities of silicon. I have discovered that if the reaction is brought about in an electric furnace, where much higher temperatures are obtainable, the absorption of silicon is very rapid and takes place in much larger amount. The carborundum decomposes into its constituent elements, carbon and silicon, the silicon uniting with the iron and the carbon being for the most part thrown out as graphite. Ferrosilicons having various proportions of silicon may be obtained by varying the relative amounts of carborundum and iron used. A typical reaction is the following, in which the charge consists of fifty-six parts iron and forty parts carborundum, and there is formed a ferrosilicon containing thirty-three per cent. silicon:

$$Fe + SiC = (Fe + Si) + C.$$

The carbon liberated in this reaction may be treated as a waste product; but I prefer to use the same as reducing material for the simultaneous production of further amounts of silicon or iron. This is accomplished by adding to the charge corresponding amounts of the oxid of silicon or the oxid of iron. The following equation is typical of the process when iron oxid is added to unite with the carbon liberated from the carborundum:

$$Fe + 3SiC + Fe_2O_3 = (3Fe + 3Si) + 3CO.$$

The following equation is typical of the process when silica is added for the purpose of uniting with the carbon liberated by the carborundum, thus producing a further quantity of silicon, which forms part of the alloy:

$$Fe + 2SiC + SiO_2 = (Fe + 3Si) + 2CO.$$

When silica is added to a mixture of the oxid and carborundum, the following equation is typical of the process:

$$5SiC + SiO_2 + Fe_2O_3 = (2Fe + 6Si) + 5CO.$$

If it is preferred to use with the carborundum only the oxid of the metal the silicide of which it is desired to produce, a mixture of the oxid and carborundum can be made such that the carbon liberated will be of the exact amount necessary to reduce the oxid, and a typical reaction may be expressed as follows:

$$Fe_2O_3 + 3SiC = (2F + 3Si) + 3CO.$$

The process may be applied also to the production of double silicides or to silicon alloys containing several metals—as, for example, an alloy containing silicon, manganese, and aluminium. For example, by using a mixture containing two hundred parts carborundum, eighty-seven parts manganese dioxid, and one hundred and two parts alumina there is obtained an alloy consisting of one hundred and forty parts silicon, fifty-five parts manganese, and fifty-four parts aluminium. This reaction may be expressed as follows:

$$5SiC + MnO_2 + Al_2O_3 = (5Si + Mn + 2Al) + 5CO.$$

Carborundum in its crystalline form is entirely free of oxygen, and the silicon therein may be said to be completely reduced. In the process of making carborundum there are formed carbon - silicon - oxygen compounds in which the silica is not completely reduced. Commercially these products are variously called "amorphous carborundum," "white stuff," &c. They are included within the broader claims of this specification under the generic term "silico-carbon compound." The product commercially known as "siloxicon," which is a silico-carbon compound produced by the incomplete reduction of silica, is also included therein. For the production of silicides according to my process the use of crystalline carborundum is the most economical, as the contained silicon is in the completely-reduced state. However, in certain cases it may be preferred to use amorphous carborundum or siloxicon on account of its lower cost. The latter material can be used after the same manner as crystalline carborundum, requiring, however, greater expenditure of electrical energy.

In the practice of my invention I may use any of the known suitable types of electric furnaces in which temperatures higher than the melting-points of iron and steel are obtained. I place the charge material therein, preferably in a broken, pulverized, or granular form, fuse it, and obtain the reactions above stated. The fused and agglomerated product is then tapped from the furnace.

When alloys of iron and silicon are made, they can be used to advantage in the manufacture of steel, and the other compounds and alloys that can be made by my process may be applied to the uses in the arts for which they are respectively adapted.

I am aware that carbid of silicon has been used as an addition to molten iron and steel at the temperatures produced in ordinary metallurgical furnaces for the purpose of improving their properties for structural and industrial uses, and I make no claim of such process. The process herein described so far as it relates to the manufacture of iron alloys contemplates their manufacture at a temperature higher than that produced in such furnaces and the production of alloys containing silicon in amounts of ten per cent. or more.

I claim—

1. The process of producing alloys and compounds which consists in subjecting metalliferous material with a carbid of an element to heat sufficient to dissociate said element from the carbon and cause its combination with the metal of the charge.

2. The process of producing metallic silicides and silicon alloys which consists in subjecting silicon carbid and metalliferous material to heat sufficient to dissociate the silicon of the carbid and cause the combination of the silicon with the metal.

3. The process of producing metallic silicides and silicon alloys which consists in subjecting crystalline silicon carbid and metalliferous material to heat sufficient to dissociate the silicon of the carbid and cause the combination of the silicon with the metal.

4. The process of producing metallic silicides and silicon alloys which consists in subjecting silicon carbid and metalliferous material to electrically-developed heat sufficient to dissociate the silicon of the carbid and cause the combination of the silicon with the metal.

5. The process of producing metallic silicides and silicon alloys which consists in subjecting silicon carbid and metalliferous material containing a metal compound or compounds to electrically-developed heat sufficient to dissociate the silicon in the carbid, reduce the metal compound contained in the metalliferous material and cause the combination of the silicon with the metal.

6. The process of producing metallic silicides and silicon alloys which consists in subjecting silicon carbid and a metal-containing substance to electrically-developed heat sufficient to dissociate the silicon in the carbid and cause a combination of the silicon with the metal.

7. The process of producing metallic silicides and silicon alloys which consists in subjecting silicon carbid and a metal-containing substance to electrically-developed heat sufficient to dissociate the silicon in the carbid, reduce the metal compound and cause the combination of the silicon with the metal.

8. The process of producing metallic silicides and silicon alloys which consists in subjecting silicon carbid, a metal-containing substance and a metal compound to electrically-developed heat sufficient to dissociate the silicon in the carbid, reduce the metal compound and cause the combination of the silicon with the metal.

9. The process of producing metallic silicides and silicon alloys which consists in subjecting silicon carbid, silicious ore and a metal-containing substance to electrically-developed heat sufficient to dissociate the silicon in the carbid, reduce the silicon in the silicious ore and cause a combination of the silicon with the metal.

10. The process of producing metallic silicides and silicon alloys which consists in subjecting silicon carbid, silicious ore and metalliferous material to electrically-developed heat sufficient to dissociate the silicon in the carbid, reduce the silicon in the silicious ore and the metal compounds contained in the metalliferous material and cause the combination of the silicon with the metal.

11. The process of producing metallic silicides and silicon alloys which consists in subjecting a mixture of silicon carbid and a metalliferous material in broken, granular or pulverized form to electrically-developed heat sufficient to dissociate the silicon in the carbid, reduce the metal compounds contained in the metalliferous material and cause the combination of the silicon with the metal.

12. The process of producing metallic silicides and silicon alloys which consists in subjecting a mixture of silicon carbid and a metal-containing substance in broken, granular or pulverized form to electrically-developed heat sufficient to dissociate the silicon in the carbid and cause the combination of the silicon with the metal.

13. The process of producing metallic silicides and silicon alloys which consists in subjecting a mixture of silicon carbid and a metalliferous material to electrically-developed heat sufficient to dissociate the silicon in the carbid, reduce the metal compounds contained in the metalliferous material and cause the combination of the silicon with the metal and the agglomerating and collecting by gravity of the metallic product in a molten mass, and then tapping the same from the furnace.

14. The process of producing metallic silicides and silicon alloys which consists in subjecting an amorphous silico-carbon compound and metalliferous material to electrically-developed heat sufficient to dissociate the silicon, reduce the partly-reduced silicon compound, and cause the combination of the silicon with the metal.

15. The process of producing metallic silicides and silicon alloys which consists in subjecting a compound containing silicon and carbon and metalliferous material to electrically-developed heat sufficient to dissociate the silicon, reduce the silicon compound, and cause the combination of the silicon with the metal.

In testimony whereof I have hereunto set my hand.

FRANK J. TONE.

Witnesses:
GEORGE W. CHORMANN,
FRED I. PIERCE.